United States Patent
Gulotta et al.

(10) Patent No.: US 10,543,881 B2
(45) Date of Patent: Jan. 28, 2020

(54) BICYCLE HANDLEBAR CUSHIONING ASSEMBLY

(71) Applicants: Robert K. Gulotta, Eau Claire, WI (US); Don Weinmeister, Eau Claire, WI (US)

(72) Inventors: Robert K. Gulotta, Eau Claire, WI (US); Don Weinmeister, Eau Claire, WI (US)

( * ) Notice: Subject to any disclaimer, the term of this patent is extended or adjusted under 35 U.S.C. 154(b) by 0 days.

(21) Appl. No.: 15/622,264

(22) Filed: Jun. 14, 2017

(65) Prior Publication Data

US 2018/0362111 A1    Dec. 20, 2018

(51) Int. Cl.
*B62K 21/26*    (2006.01)

(52) U.S. Cl.
CPC ................... *B62K 21/26* (2013.01)

(58) Field of Classification Search
CPC ................ B62K 1/26; Y10T 74/20828
See application file for complete search history.

(56) References Cited

U.S. PATENT DOCUMENTS

| | | |
|---|---|---|
| 588,794 A | 8/1897 | Granger |
| 599,131 A | 2/1898 | King |
| 657,697 A | 9/1900 | Getz |
| 2,425,245 A * | 8/1947 | Johnson ............... B25D 17/043 16/422 |
| 3,713,350 A | 1/1973 | Brilando |
| 4,380,093 A * | 4/1983 | Morgan ................ B62K 21/26 16/421 |
| 4,506,562 A * | 3/1985 | Yamaura ............... F16H 57/027 137/846 |
| 5,193,246 A | 3/1993 | Huang |
| 5,207,713 A * | 5/1993 | Park ....................... B60R 21/05 280/750 |
| 5,209,508 A | 5/1993 | Lennon |
| 5,253,435 A | 10/1993 | Auger et al. |
| 5,348,360 A * | 9/1994 | Mencarelli ............ B25G 1/01 16/421 |
| 5,355,552 A | 10/1994 | Huang |
| 6,821,218 B2 | 11/2004 | Byrne et al. |
| 7,082,958 B2 * | 8/2006 | Wang .................... F16K 15/205 137/223 |
| 8,771,115 B2 * | 7/2014 | Berggren ............... A63B 41/02 473/605 |
| 8,881,347 B2 | 11/2014 | Feinstein |
| 2004/0007086 A1 * | 1/2004 | Cummings ........... B62K 21/26 74/551.9 |
| 2004/0050205 A1 * | 3/2004 | Putnam ................. B62K 21/26 74/558 |
| 2005/0043110 A1 | 2/2005 | Lindsey |
| 2007/0137410 A1 * | 6/2007 | Chang .................... B62K 21/26 74/551.9 |

FOREIGN PATENT DOCUMENTS

CN    2203952    7/1995

* cited by examiner

*Primary Examiner* — Patrick Cicchino

(57) ABSTRACT

A bicycle handlebar cushioning assembly includes a mount for positioning on and releasably engaged by and retained on bicycle handlebars. The mount releasably snaps onto and frictionally engages the bicycle handlebars. The mount has a first end and a second end and is elongated from the first end to the second end. A cushioning member is non-removably attached to the mount. The cushioning member is resiliently compressible.

6 Claims, 5 Drawing Sheets

BICYCLE HANDLEBAR CUSHIONING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to handlebar cushion devices and more particularly pertains to a new handlebar cushion device for that is removably mountable and positionable on bicycle handlebars to cushion the lower palm area of a person gripping the handlebars.

BRIEF SUMMARY OF THE INVENTION

An embodiment of the disclosure meets the needs presented above by generally comprising a mount for positioning on and releasably engaged by and retained on bicycle handlebars. The mount releasably snaps onto and frictionally engages the bicycle handlebars. The mount has a first end and a second end and is elongated from the first end to the second end. A cushioning member is non-removably attached to the mount. The cushioning member is resiliently compressible.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
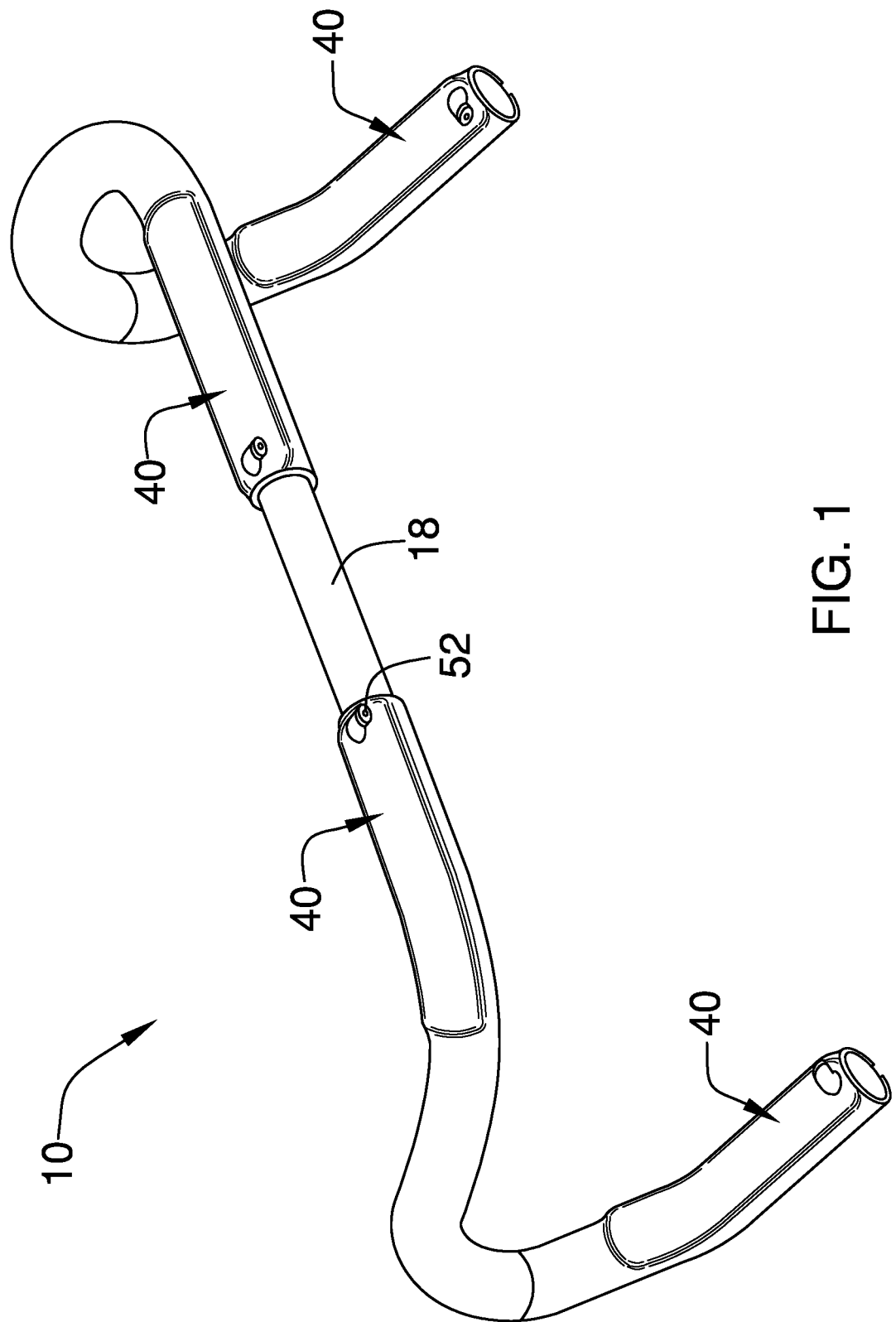
FIG. 1 is a top perspective in-use view of a bicycle handlebar cushioning assembly according to an embodiment of the disclosure.
Figure 2:
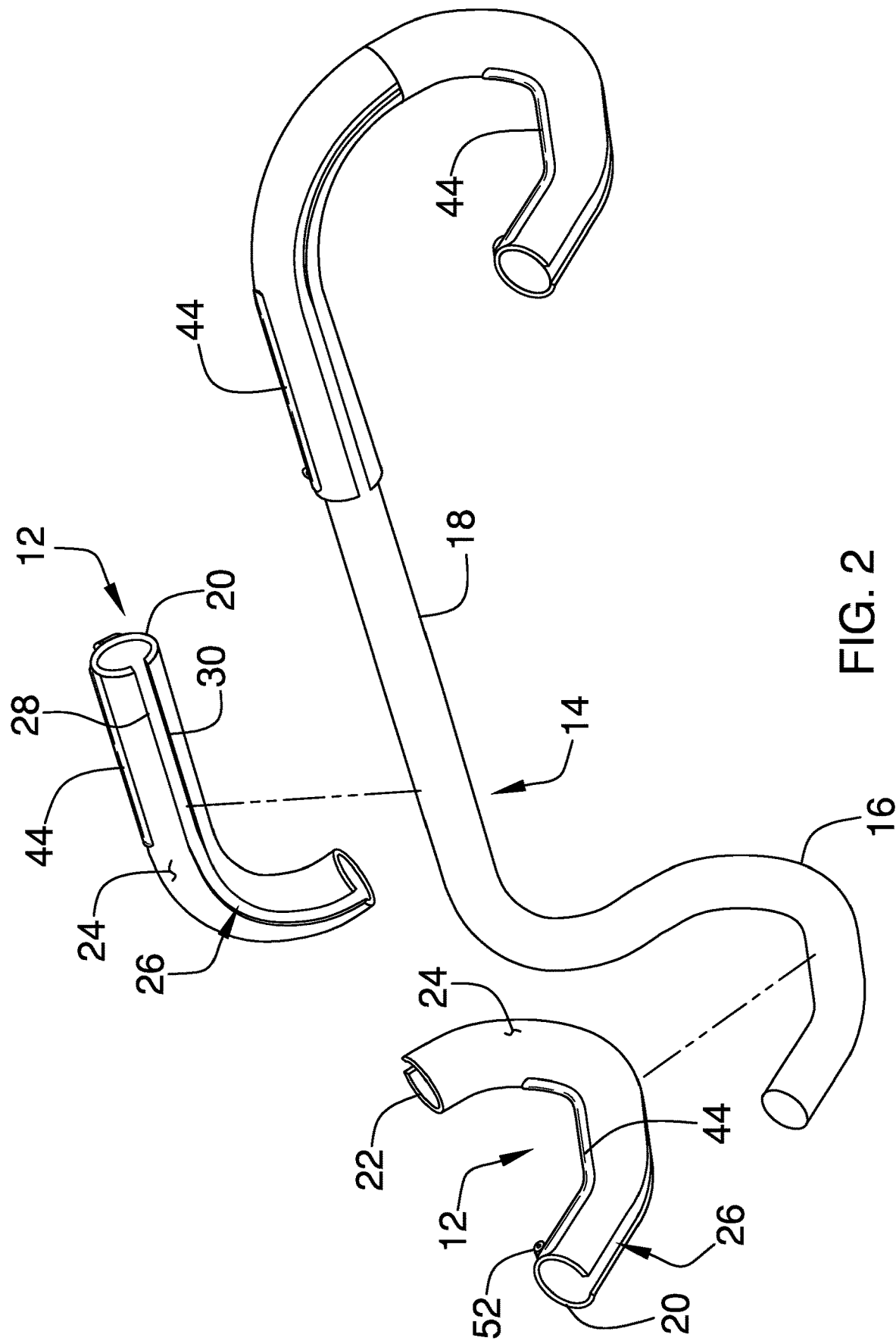
FIG. 2 is a bottom perspective view of an embodiment of the disclosure.
Figure 3:
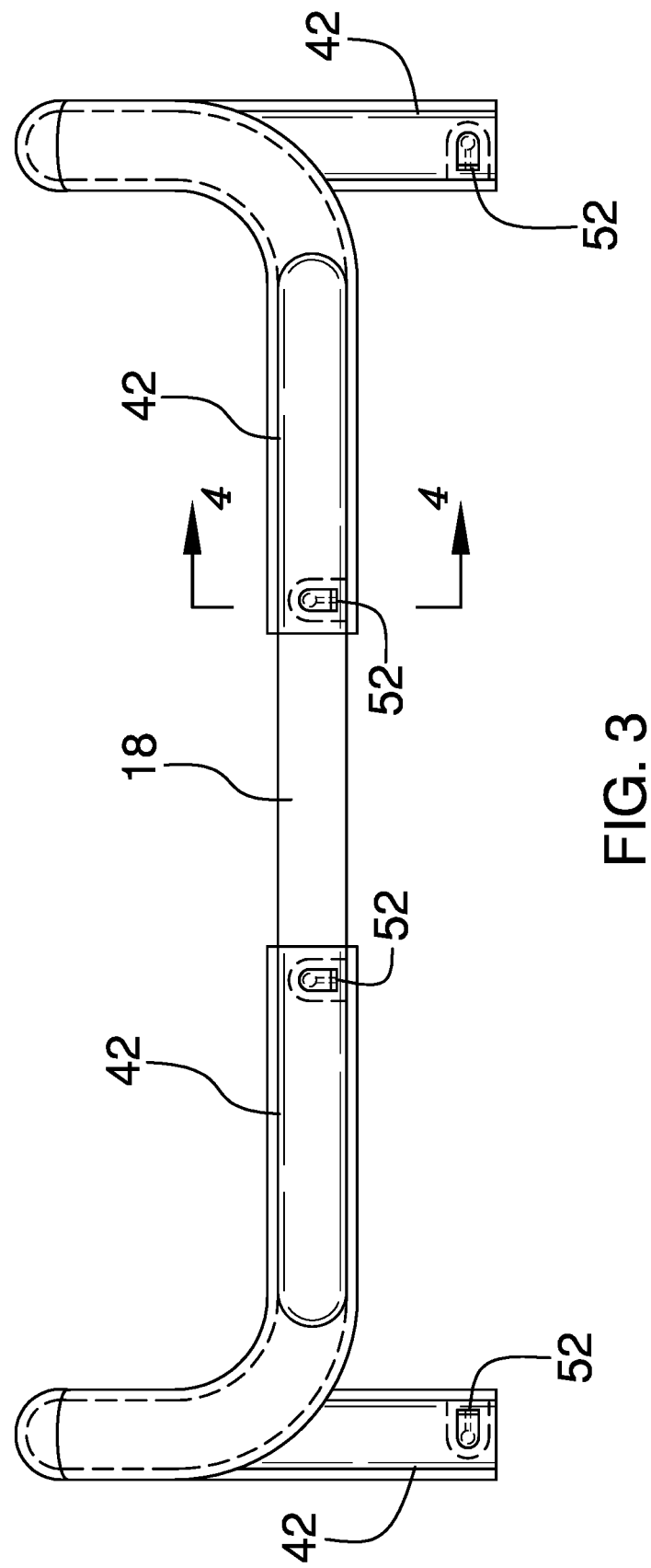
FIG. 3 is a top view of an embodiment of the disclosure.
Figure 4:
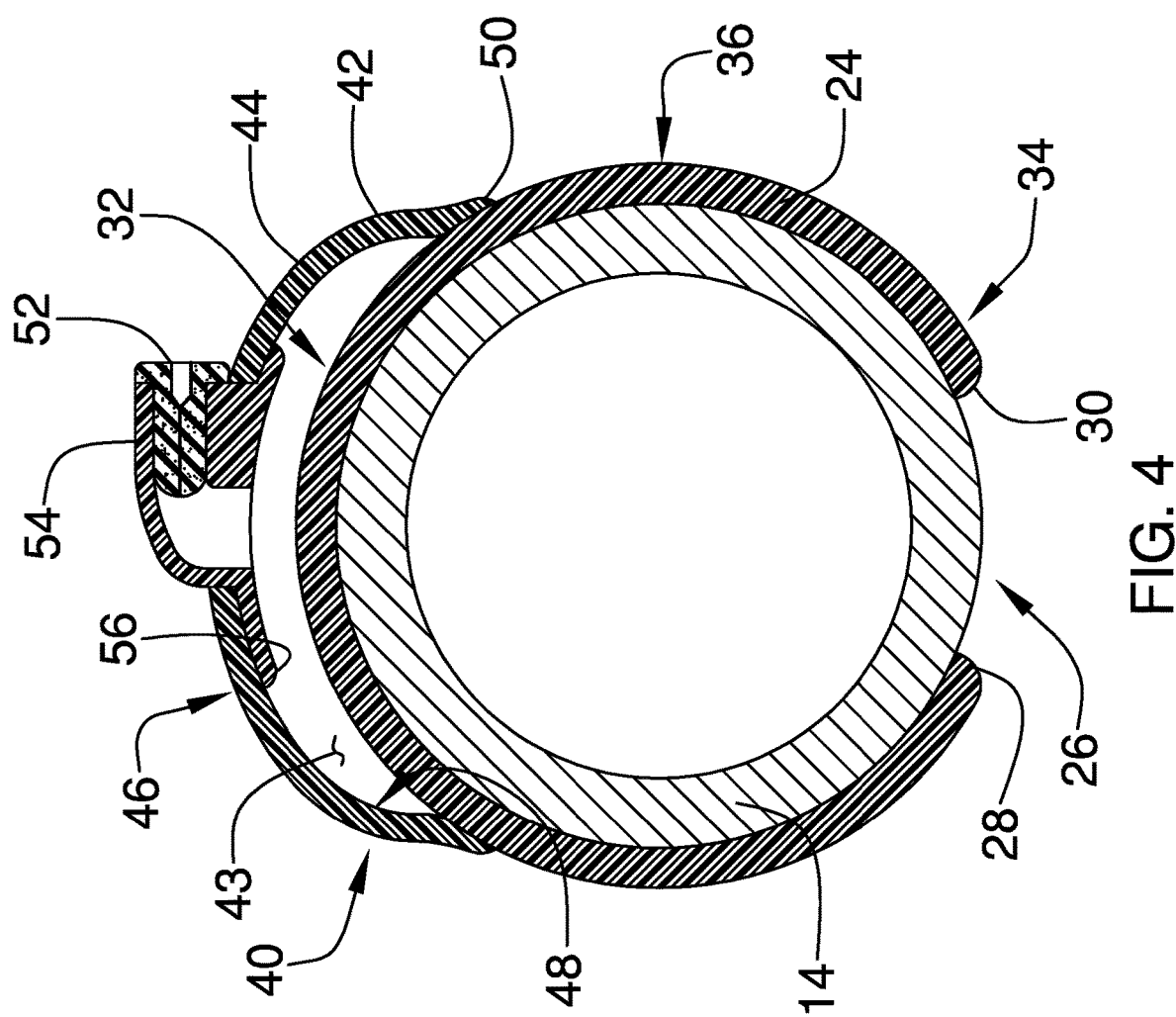
FIG. 4 is a cross-sectional view of an embodiment of the disclosure taken along line 4-4 of FIG. 3.
Figure 6:
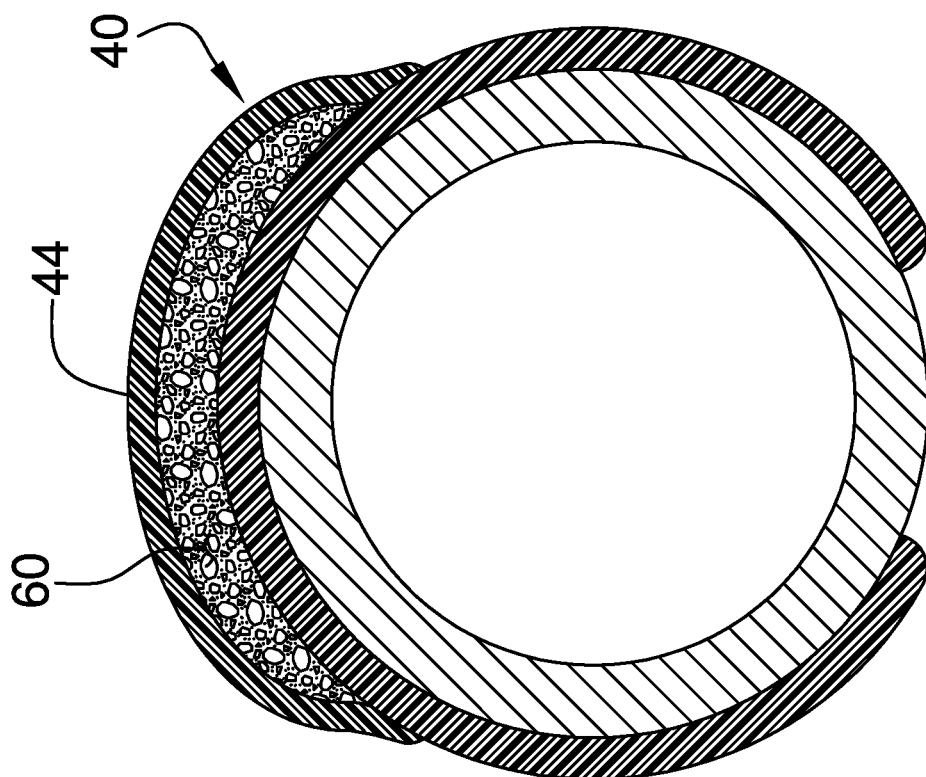
FIG. 6 is a cross-sectional view of an embodiment of the disclosure utilizing a foam material.
Figure 5:
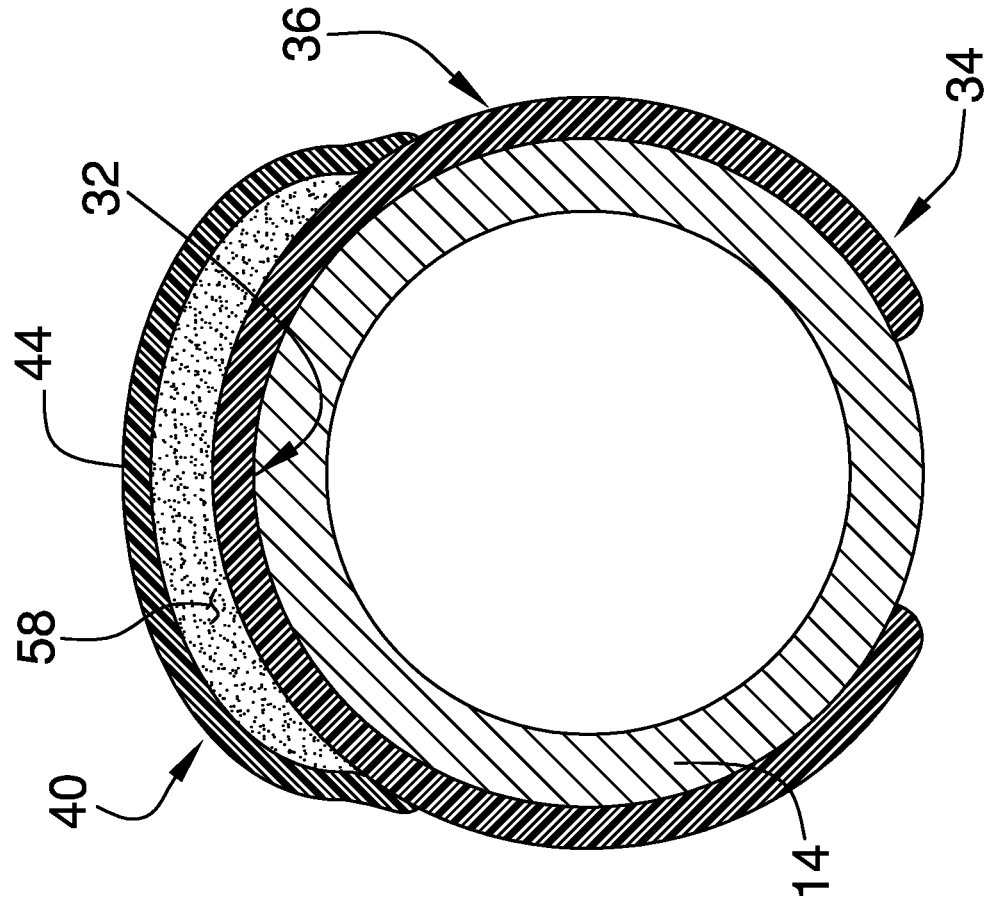
FIG. 5 is a cross-sectional view of an embodiment of the disclosure utilizing a gel material.

With reference now to the drawings, and in particular to FIGS. 1 through 6 thereof, a new handlebar cushion device embodying the principles and concepts of an embodiment of the disclosure and generally designated by the reference numeral 10 will be described.

As best illustrated in FIGS. 1 through 6, the bicycle handlebar cushioning assembly 10 generally comprises a mount 12 configured to releasably engage and be retained on a set of bicycle handlebars 14. The bicycle handlebars 14 are conventional and may in particular comprise what are known as drop bars 16 used on road bikes such as those found in long distance and race bicycling. These types of bicycle handlebars 14 generally include a stem, not shown, attached to a crosspiece 18 having a pair of opposed ends. To each of the opposed ends is attached a drop, or drop bars 16, which extends forward from the crosspiece 18 and then arcs downwardly and back to form a laterally angled U-shaped structure. The junctures of the crosspiece 18 and the drops 16 are also formed by arcs.

The mount 12 has a first end 20 and a second end 22 and is elongated from the first end 20 to the second end 22. The mount 12, by being elongated, will typically be contoured to match the contour of sections of the bicycle handlebars 14 and in particular the arcs in the transitions from the crosspiece 18 to the drop bars 16 and the arcs in the drop bars 16 themselves. These contours, used to fit the arcuate portions of the bicycle handlebars 14, ensure that the mount 12 will not rotate with respect to the bicycle handlebars 14. As can be seen in the Figures, the assembly 10 may comprise a plurality of modular cushion attachments wherein two of the assemblies 10 are positioned on the crosspiece 18, on either side of the step, and each of the drop bars 16 may further include one of the assemblies 10. Some road bike handlebars include yet other sections being defined as lower grips, not shown, which extend from free ends of the drops bars 16 toward each other. If such lower grips are present, an example of which is shown at element 80 in U.S. Pat. No. 5,209,508 incorporated herein as a reference, assemblies 10 may be positioned thereon as well.

The mount 12, of each assembly 10 or modular cushion attachment, has a perimeter wall 24 extending between the first 20 and second 22 ends. The perimeter wall has an elongated break 26 therein extending between and through the first 20 and second 22 ends. A first free edge 28 of the perimeter wall 24 and a second free edge 30 of the perimeter wall 24 are defined on opposite sides of the break 26 and are opposed with respect to each other. The break 26 may be widened, as needed, to receive the bicycle handlebars 14 such that the mount 12 snaps onto and frictionally engages the bicycle handlebars 14. The perimeter wall 24 has an upper portion 32 and a lower portion 34 positioned opposite of each other. A central portion 36 may be defined between the upper 32 and lower 34 portions and the break 26 is positioned in the lower portion 34. The term "lower portion" herein is defined to generally mean a portion of the mount 12 that is faced downward and away or outwardly and away from a rider of the bicycle. Typically the break 26 will be positioned on a bottom surface of the bicycle handlebars 14 so that a rider's palms are positioned on the mount 12 opposite of the break 26.

The mount 12 is comprised of a resiliently bendable material. The bendable material may comprise a plastic material, carbon composite material, elastomer and the like but should have sufficient rigidity to not easily alter its shape along its length. Thus, when the mount 12 is positioned on the bicycle handlebars 14 and extends along arcuate portions thereof, the mount 12 will not easily rotate with respect to the bicycle handlebars 14. The perimeter wall of the mount will typically have a thickness of less than 0.50 inches and a length from the first end to the second end being less than 12.0 inches. Although adjacent ones of the assemblies 10 are shown as abutting in FIG. 1, this is not required and often will not be the case. The mount 12, as it would be understood, is easily positioned on and removed from the bicycle handlebars 14 to allow the assembly 10 to facilitate retrofitting with existing bicycle handlebars as well to allow for easy replacement and/or variance as needed.

A cushioning member 40 is non-removably attached to the mount 12. The cushioning member 40 is elongated with respect to a line extending along the perimeter wall 24 from the first end 20 to the second end 22. The cushioning member 40 may be positioned opposite the break 26 and may be spaced from the break 26 such that the lower portion 34 of the mount 12 is completely free of the cushioning member 40. More specifically, the cushioning member 40 may be positioned solely on the upper portion 32 though a portion of the cushioning member 40 may also be positioned on the central portion 36 as well. This will allow the assembly 10 to serve its purpose as a cushion for a particular portion of a person's hand without adding too greatly to the overall circumference of the bicycle handlebars 14 such that they feel unnatural or uncomfortable to the rider. Specifically, the cushioning member 40 forms a cushioned support upon which a rider will rest their hands generally and more purposely the lower portion of their palms near the wrists and bottom of the thumbs.

In one embodiment of the invention, the cushioning member 40 comprises a bladder 42 having an interior space 43 that is fillable with compressed air to form a cushion. The bladder 42 structure may comprise a self-contained air pocket that is adhered or formed onto the mount 12. Alternatively, the bladder 42 may comprise a panel 44 that has a top side 46, a bottom side 48 and a perimeter edge 50. The bottom side 48 of the panel 44, adjacent to the perimeter edge 50, is adhered to an outer surface of the perimeter wall 24 such that an airtight seal, coextensive with the perimeter edge 50, is formed between the bottom side 48 and the outer surface of the perimeter wall 24. The panel 44 may be adhered to the mount 12 in any number of ways but one method of bonding which may be preferred is bonding the two permanently together utilizing radio frequency welding (RF welding). This method works particularly well should the materials of the mount 12 and the panel 44 be sufficiently thin and comprise a plastic material well suited to RF welding. Alternate methods may include, for example, heat welding, adhesives, stitching or combinations thereof. In all cases, the panel 44 will form a unitary structure with the perimeter wall 24 such that it cannot be removed from the mount 12. The panel 44 is comprised of a resiliently flexible material which may have some elasticity for allowing the panel 44 to slightly stretch as well. However, as with a conventional basketball or football, the bladder 42 will generally retain its shape as long the air therein is above atmospheric pressure and will retain this same shape up to at least 1.5 times the atmospheric pressure and potentially up to at least 4.0 times the atmospheric pressure.

A valve 52 is in fluid communication with the interior space 43 of the bladder 42. The valve 52 is configured to receive the compressed into the interior space 43. The valve 52 may comprise a conventional one way air valve to retain the compressed air within the interior space 43. One type of valve may be such that it receives a needle from a conventional tire/ball pump. Alternatively, the valve 52 may be tire valve of the type including a pin for releasing/allowing air and which is fluidly couplable to a bike tire pump which clamps onto the valve 52. The valve 52 may be mounted within a housing 54 which includes a perimeter flange 56. The perimeter flange 56 is attached to and sealed against the bottom side 48 of the panel 44 to form an airtight seal with the panel 44. The valve 52, though shown as a one way valve, may be configured to include an air release. Furthermore, the assembly 10 may include a built in air pump structure as has been found in the athletic shoe industry. Such a pump is found, for instance, in U.S. Pat. No. 5,253,435 incorporated herein by reference.

In another embodiment of the invention, the bladder 42 above may be filled with a gel material 58. The gel material 58 would typically be sealed within the bladder 42 such that the valve 52 would not be needed. A gel material 58 may work well for its ability to retain its shape for a short period of time. Alternatively, the bladder 42 may instead comprise a pocket housing a compressible foam material 60. The foam material 60 is a conventional foamed elastomer and may include what are ubiquitously known as gel foams. The foam material 60 may also retain its shape for a short period of time and further includes the benefit of not having to be in a sealed bladder. Moreover, if a foam material 60 is utilized, the panel 44 may be comprised of a breathable material.

In use, the assembly 10, and more typically multiple ones thereof, are mounted onto bicycle handlebars 14 by snapping the mount 12 into place on the bicycle handlebars 14. If the bladder 42 is to be filled with air and include a valve 52, the user will then selectively pump air into the bladder 42 until the bladder 42 has a desired compressibility. The user, who is also presumably a rider of the bicycle, will then utilize the assembly 10 to cushion the areas of the hand which receive the most pressure due to the rider leaning forward and supporting their weight on the bicycle handlebars 14. The cushioning member 40 cushions the lower palm regions to provide comfort and prevent nerve compression and pain in these areas.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cushioned grip assembly configured for being removably positioned on bicycle handlebars, said assembly comprising:
   a mount, said mount being contoured such that said mount is configured to be complementary in shape to the bicycle handlebars, said mount having a perimeter wall, said perimeter wall having a first end and a second end and being elongated from said first end to said second end, said perimeter wall having an elongated break therein extending between and through said first and second ends, a first free edge of said perimeter wall and a second free edge of said perimeter wall being defined on opposite sides of said break, wherein said break is configured to receive the handlebars, said mount being rigid such that said mount snaps onto and is configured to frictionally engage the bicycle handlebars;
   a cushioning member being non-removably attached to said mount, said cushioning member being resiliently compressible, said cushioning member comprising a bladder having an interior space being fillable with compressed air, said bladder comprising a panel having a top side, a bottom side and a perimeter edge, said bottom side of said panel being adhered to an outer surface of said perimeter wall such that an airtight seal coextensive with said perimeter edge is formed between said bottom side and said outer surface, said panel being comprised of a resiliently flexible material.

2. The cushioned grip assembly according to claim 1, wherein said perimeter wall has an upper portion and a lower portion positioned opposite of each other, said break being positioned in said lower portion.

3. The cushioned grip assembly according to claim 1, wherein said cushioning member is elongated with respect to a line extending along said perimeter wall from said first end to said second end.

4. A cushioned grip assembly configured for being removably positioned on bicycle handlebars, said assembly comprising:
   a mount, said mount being contoured such that said mount is configured to be complementary in shape to the bicycle handlebars, said mount having a perimeter wall, said perimeter wall having a first end and a second end and being elongated from said first end to said second end, said perimeter wall having an elongated break therein extending between and through said first and second ends, a first free edge of said perimeter wall and a second free edge of said perimeter wall being defined on opposite sides of said break, wherein said break is configured to receive the handlebars, said mount being rigid such that said mount snaps onto and is configured to frictionally engage the bicycle handlebars, said perimeter wall having an upper portion and a lower portion positioned opposite of each other, said break being positioned in said lower portion, said mount being comprised of a resiliently bendable material;
   a cushioning member being non-removably attached to said mount, said cushioning member being resiliently compressible, said cushioning member being elongated with respect to a line extending along said perimeter wall from said first end to said second end, said cushioning member comprising a bladder, said bladder having an interior space being fillable with compressed air, said bladder comprising a panel having a top side, a bottom side and a perimeter edge, said bottom side of said panel being adhered to an outer surface of said perimeter wall such that an airtight seal coextensive with said perimeter edge is formed between said bottom side and said outer surface, said panel being comprised of a resiliently flexible material, said panel forming a unitary structure with said perimeter wall, said bladder being positioned opposite of said break, said cushioning member comprising
      a bladder having an interior space being fillable with compressed air, said bladder comprising a panel having a top side, a bottom side and a perimeter edge, said bottom side of said panel being adhered to an outer surface of said perimeter wall such that an airtight seal coextensive with said perimeter edge is formed between said bottom side and said outer surface, and
      a valve being in fluid communication with said interior space of said bladder, wherein said valve is configured to receive the compressed air into said interior space, said valve comprising a one way air valve to retain the compressed air within said interior space; and
   a valve being in fluid communication with said interior space of said bladder, wherein said valve is configured to receive the compressed air into said interior space, said valve comprising a one way air valve to retain the compressed air within said interior space, said valve being mounted within a housing including a perimeter flange, said perimeter flange being attached to and sealed against said panel.

5. A cushioned grip system comprising:
   a bicycle handlebars;
   a mount, said mount being contoured such that said mount is complementary in shape to the bicycle handlebars, said mount having a perimeter wall, said perimeter wall having a first end and a second end and being elongated from said first end to said second end, said perimeter wall having an elongated break therein extending between and through said first and second ends, a first free edge of said perimeter wall and a second free edge of said perimeter wall being defined on opposite sides of said break, wherein said break is positioned to receive the handlebars, said mount being rigid such that said mount snaps onto and frictionally engages the bicycle handlebars; and
   a cushioning member being non-removably attached to said mount, said cushioning member being resiliently compressible, said cushioning member comprising a bladder having an interior space being fillable with compressed air, said bladder comprising a panel having a top side, a bottom side and a perimeter edge, said bottom side of said panel being adhered to an outer surface of said perimeter wall such that an airtight seal coextensive with said perimeter edge is formed between said bottom side and said outer surface, and a valve being in fluid communication with said interior space of said bladder, wherein said valve is configured to receive the compressed air into said interior space, said valve comprising a one way air valve to retain the compressed air within said interior space, said valve being mounted within a housing including a perimeter flange, said perimeter flange being attached to and sealed against said panel.

6. The cushioned grip system according to claim 4, wherein said perimeter wall has an upper portion and a lower portion positioned opposite of each other, said break being positioned in said lower portion, said mount being comprised of a resiliently bendable material.

\* \* \* \* \*